United States Patent
Jansson

(10) Patent No.: US 10,101,141 B2
(45) Date of Patent: Oct. 16, 2018

(54) TRIGGER COUNTER FOR MEASUREMENT DEVICE WITH COUNT VALUES STORED IN FLASH MEMORY

(71) Applicant: Mitutoyo Corporation, Kanagawa-ken (JP)

(72) Inventor: Bjorn Erik Bertil Jansson, Snohomish, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 161 days.

(21) Appl. No.: 15/371,850

(22) Filed: Dec. 7, 2016

(65) Prior Publication Data

US 2018/0156594 A1 Jun. 7, 2018

(51) Int. Cl.
*G01B 5/012* (2006.01)
*G01B 21/04* (2006.01)

(52) U.S. Cl.
CPC ........... *G01B 5/012* (2013.01); *G01B 21/047* (2013.01)

(58) Field of Classification Search
CPC ....... G01B 5/008; G01B 5/012; G01B 21/047
See application file for complete search history.

(56) References Cited

U.S. PATENT DOCUMENTS

| | | | |
|---|---|---|---|
| 4,078,314 A | 3/1978 | McMurtry | |
| 4,316,329 A | 2/1982 | Watson | |
| 5,526,576 A | 6/1996 | Fuchs et al. | |
| 5,755,038 A | 5/1998 | McMurtry | |
| 5,825,666 A | 10/1998 | Freifeld | |
| 6,430,833 B1 | 8/2002 | Butter et al. | |
| 6,449,861 B1 | 9/2002 | Danielli et al. | |

(Continued)

FOREIGN PATENT DOCUMENTS

| | | |
|---|---|---|
| EP | 1 086 352 B1 | 11/2004 |
| EP | 2 018 934 A1 | 1/2009 |
| JP | 6-51910 U | 7/1994 |

OTHER PUBLICATIONS

Wikipedia, "Field-programmable gate array," retrieved from URL= http://enwikipedia.org/wiki/Field-programmable_gate_array, on Nov. 15, 2016, 13 pages.

(Continued)

*Primary Examiner* — Manuel L Barbee
(74) *Attorney, Agent, or Firm* — Seed Intellectual Property Law Group LLP

(57) ABSTRACT

A system and method are provided for operating a touch probe for a coordinate measuring machine, wherein a value is permanently stored in the touch probe corresponding to an accumulated number of trigger signals generated in the touch probe over its operating history. For a non-erase cycle during which an erasable trigger counter block (e.g., included in a flash memory) of the touch probe is not erased, increasing values of an accumulated trigger count are stored in N address locations of the erasable trigger counter block. After all of the N address locations have been used, an erase operation sequence is performed, and a new non-erase cycle is initiated for repeating the process. In various implementations, the touch probe may not include an embedded processor or battery, for which the types of circuitry and methods that may be utilized for maintaining and storing the accumulated trigger count are correspondingly limited.

25 Claims, 8 Drawing Sheets

(56) References Cited

U.S. PATENT DOCUMENTS

| | | | |
|---|---|---|---|
| 6,487,785 B1 | 12/2002 | Ritz | |
| 6,643,944 B2* | 11/2003 | Yoda | G01B 7/012 33/558 |
| 6,772,527 B1 | 8/2004 | Butter et al. | |
| 6,971,183 B2 | 12/2005 | Brenner et al. | |
| 7,652,275 B2 | 1/2010 | Gladnick | |
| 7,676,945 B2 | 3/2010 | Prestidge et al. | |
| 7,792,654 B2 | 9/2010 | Prestidge et al. | |
| 8,438,746 B2 | 5/2013 | Usui | |
| 9,021,177 B2 | 4/2015 | Segal et al. | |
| 2011/0192044 A1 | 8/2011 | Usui | |
| 2013/0050701 A1 | 2/2013 | Jensen et al. | |
| 2015/0323300 A1 | 11/2015 | Briegel et al. | |

OTHER PUBLICATIONS

Wikipedia, "Flash memory," retrieved from URL=http://en.wikipedia.org/wiki/Flash_memory on Nov. 12, 2016, 18 pages.
Extended European Search Report, dated Mar. 2, 2018, for European Application No. 17205946.1-1022, 5 pages.

* cited by examiner

US 10,101,141 B2

TRIGGER COUNTER FOR MEASUREMENT DEVICE WITH COUNT VALUES STORED IN FLASH MEMORY

BACKGROUND

Technical Field

This disclosure relates to precision metrology, and more particularly to touch probes used in coordinate measurement systems.

Description of the Related Art

Certain coordinate measurement systems, e.g., one-dimensional or three-dimensional measurement systems, such as coordinate measuring machines (CMMs), may obtain measurements of a workpiece using a touch probe configured to detect when a stylus of the touch probe contacts a workpiece. Touch probes use various types of displacement sensors to sense deflection of the touch probe stylus for an indication that it has contacted a workpiece.

An exemplary prior art CMM utilizing a touch probe is described in U.S. Pat. No. 5,526,576 (the '576 patent), which is hereby incorporated herein by reference in its entirety. The '576 patent discloses a movement mechanism comprising multiple drives for moving the touch probe, and an associated electronic system including features related to processing signals in or from the touch probe body or head. A CMM employing a mechanical contact touch probe is also described in U.S. Pat. No. 6,971,183 (the '183 patent), which is hereby incorporated herein by reference in its entirety. The touch probe disclosed in the '183 patent includes a stylus having a surface contact portion, an axial motion mechanism and a rotary motion mechanism. Another exemplary touch probe is disclosed in U.S. Pat. No. 5,755,038 (the '038 patent), which is hereby incorporated herein by reference in its entirety. The '038 patent discloses a touch probe that includes a resiliently supported moving load member that is connected near an upper end of a rigid support structure to a resilient diaphragm. Three compliant struts which connect the moving load member to a lower end of the rigid support structure each include a strain gauge connected to an ASIC (application-specific integrated circuit) signal processor to generate a trigger signal in response to movement of the load member relative to the rigid supporting structure. U.S. Pat. No. 7,676,945 (the '945 patent), which is hereby incorporated herein by reference in its entirety, discloses a measurement probe comprising a stylus module with an inbuilt failure mode related to a predetermined operational lifetime of the module (e.g., the lifetime of a battery included in the stylus module).

While the systems disclosed in the disclosed in the '576, '183, '038 and '945 patents include a number of features related to processing signals in the touch probes, and/or storing or communicating certain types of operating parameters and/or data, in practice such features have been accompanied by undesirable tradeoffs in terms of probe size, and/or battery requirements, and/or ease of use, or the like. Improved systems and features which enable touch probes to store and communicate additional operating data without adding undesirable tradeoffs (e.g., while maintaining a minimum size, ease of use, and low maintenance) would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Prior art touch probe configurations, including those indicated above, have been determined to have various undesirable combinations of features. The performance levels and miniaturization currently demanded in touch probe bodies has typically forced tradeoffs between all elements combined in such devices, particularly when adding a new feature or capability. For example, increased signal processing internal to a touch probe has generally contributed to increased size. Various solutions for data storage in a probe have either used volatile memory (compromising the related reliability and/or ease of use), or required additional components and/or space (e.g., an increased probe size) and/or required a battery (compromising cost, size, and maintenance cost), and/or have otherwise had a limited capacity to track and store operating parameters or information in a complete and easy to use manner. One factor hindering improved solutions to these problems has been that it has proved difficult to provide configurations that achieve similar high accuracy measurements (e.g., micron or submicron level repeatability), and internal signal processing and memory functions, in a compact configuration (e.g., on the order of 12-15 millimeter diameter in some implementations, or about the size of a human "pinky" finger).

In contrast to the prior art, disclosed herein is a configuration for a touch probe that includes a unique combination of features which allows permanently storing in the touch probe an ongoing accumulated and essentially unlimited count of all touch "trigger" signals generated by the touch probe (e.g., hundreds of millions of "touches"), without the need for an associated size increase, and without a battery, and while allowing high reliability data recording and retention and simple interaction and ease of use in relation to the host CMM system. Storing such accumulated trigger signal data in the touch probe makes the probe particularly easy to use and monitor (even when the probe is moved between different host CMMs). By way of example, and not by way of limitation, such data may be useful in relation to monitoring or compensating for stylus wear (e.g., the wear of a ruby tip against hard workpieces), and/or probe calibration or maintenance or accuracy check intervals, and/or overall "cost per measurement" analyses, or the like.

In accordance with various principles disclosed herein, a touch probe is provided that includes a displacement sensor, a trigger signal generating circuit, a trigger counter processing circuit, and a probe flash memory. The displacement sensor is configured to output at least one sensor signal that is responsive to displacement of a stylus attached to the touch probe. The trigger signal generating circuit inputs the at least one sensor signal and produces a trigger signal corresponding to a displacement of the stylus. The trigger counter processing circuit (e.g., as implemented as a state machine in volatile memory upon an initialization) counts trigger signals when they occur and maintains a corresponding current accumulated trigger count, wherein terminating power to the touch probe may stop operation of the trigger counter processing circuit and end its maintenance of the current accumulated trigger count. The probe flash memory includes a first probe memory portion and a second probe memory portion. The first probe memory portion includes an erasable trigger counter block including N address locations utilized to store a sequence of accumulated trigger counts received from the trigger counter processing circuit. The second probe memory portion stores operating configuration data for the touch probe (e.g., including configuration data for implementing the trigger counter processing circuit in volatile memory upon an initialization, etc.).

In various implementations, for powered operating periods of the touch probe during a non-erase cycle during which the erasable trigger counter block is not erased, increasing values of the accumulated trigger count are stored in the N address locations of the erasable trigger counter block, as may be implemented through operations such as the following. When a new powered operating period is started, the trigger counter processing circuit may be initialized with the most recent previously stored value of the accumulated trigger count, a trigger counter operation increment monitor may be initialized, and a target address location of the erasable trigger counter block may be initialized to be used for a next operation storing a current accumulated trigger count. The trigger counter processing circuit may be operated to count trigger signals when they occur and to maintain the corresponding current accumulated trigger count. After a pre-defined trigger counter operation increment elapses, at least if the current accumulated trigger count has increased from the most recent previously stored value of the accumulated trigger count, the current accumulated trigger count may be stored using the target address location. After the current accumulated trigger count has been stored, a next target address location of the erasable trigger counter block may be identified to be used for a next operation storing a current accumulated trigger count, wherein the next target address location may be an address location that has not been used in the current non-erase cycle. The operations for storing the current accumulated trigger count and identifying the next target address location may be repeated a plurality of times until all of the available N address locations of the erasable trigger counter block have been used for storing respective accumulated trigger counts. After all of the available N address locations have been used, an erase operation sequence may be performed while the trigger counter processing circuit maintains the current accumulated trigger count, and a new non-erase cycle may then be initiated for repeating the process.

DETAILED DESCRIPTION

Figure 1:
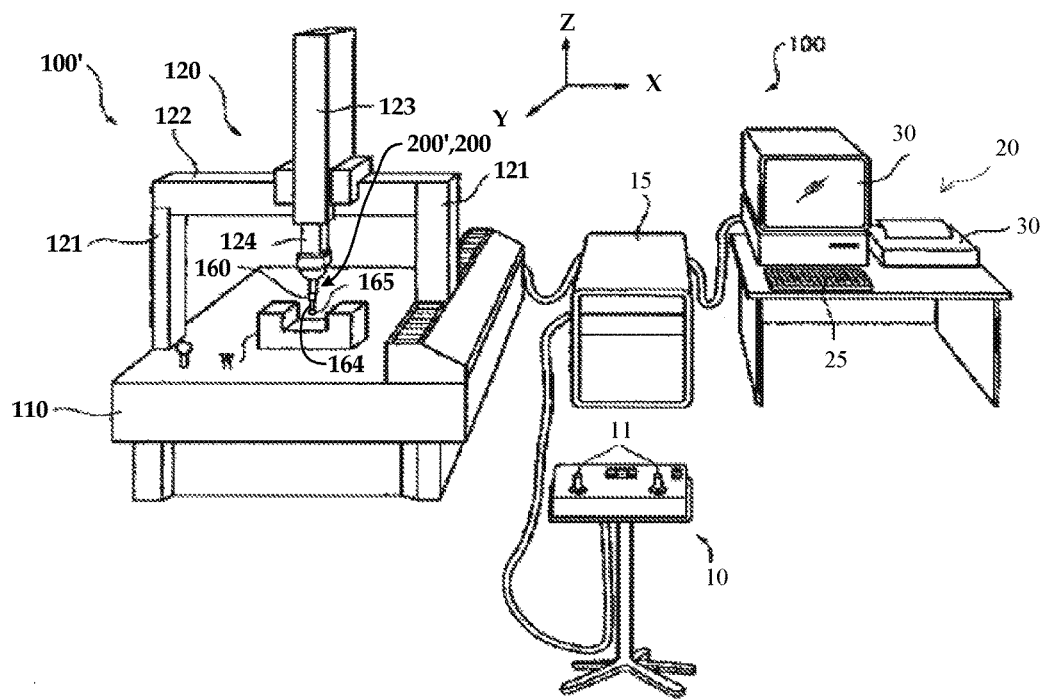
FIG. 1 is a diagram showing various components of a measuring system including a CMM utilizing a touch probe such as that disclosed herein.

FIG. 1 is a diagram showing various components of a measuring system 100 including a CMM 100' utilizing a touch probe 200' such as that disclosed herein. Coordinate measuring machines (CMMs) are known in the art, for example, in U.S. Pat. Appl. Publ. No. 2011/0192044, to Usui, which is hereby incorporated by reference in its entirety. An arrangement of a CMM is illustrated schematically in FIG. 1, showing a measuring system 100 including a CMM 100', which uses a touch probe 200'. The touch probe 200' may include a probe body 200. The measuring system 100 includes an operating unit 10, a motion controller 15 that controls movements of the CMM 100', a host computer 20 and the CMM 100'. The operating unit 10 is coupled to the motion controller 15 and may include joysticks 11 for manually operating the CMM 100'. The host computer 20 is coupled to the motion controller 15 and operates the CMM 100' and processes measurement data for a workpiece W according to known methods. The host computer 20 includes input means 25 (e.g., a keyboard, etc.) for inputting, for example, measurement conditions, and output means 30 (e.g., a display, printer, etc.) for outputting, for example, measurement results.

The CMM 100' includes a drive mechanism 120 which is located on a surface plate 110, and an attachment portion 124 for attaching the touch probe 200' to the drive mechanism 120. The drive mechanism 120 includes x-axis, y-axis, and z-axis slide mechanisms 122, 121, and 123, respectively, for moving the touch probe 200' three-dimensionally. A stylus 164 attached to the touch probe 200' includes a contact portion 165. A stylus module 160 may attach the stylus 164 to a stylus suspension portion of the probe body 200, which allows the stylus 164 to deflect when its contact portion 165 (e.g., a ruby sphere) contacts the surface of the workpiece W, to produce a touch trigger signal. The characteristics and operations of commercially available CMMs are generally known in the art, and are therefore not described in greater detail herein.

The touch probe 200' provides a 3-D tactile probing system having characteristics such as general mechanical stiffness and signal sensitivity to the deflection of the stylus 164, so that the characteristics can be reliably trusted to properly reflect the actual coordinates measured by the probing system, with repeatability at the submicron level. For economical high throughput, it may be generally desirable to perform all operations (e.g., motions and sensing) of the CMM 100' at high speed. An exemplary implementation of a high-speed contact detector is disclosed in U.S. Pat. Appl. Publ. No. 2015/0323300, to Briegel et al., which is hereby incorporated herein by reference in its entirety.

Figure 2:
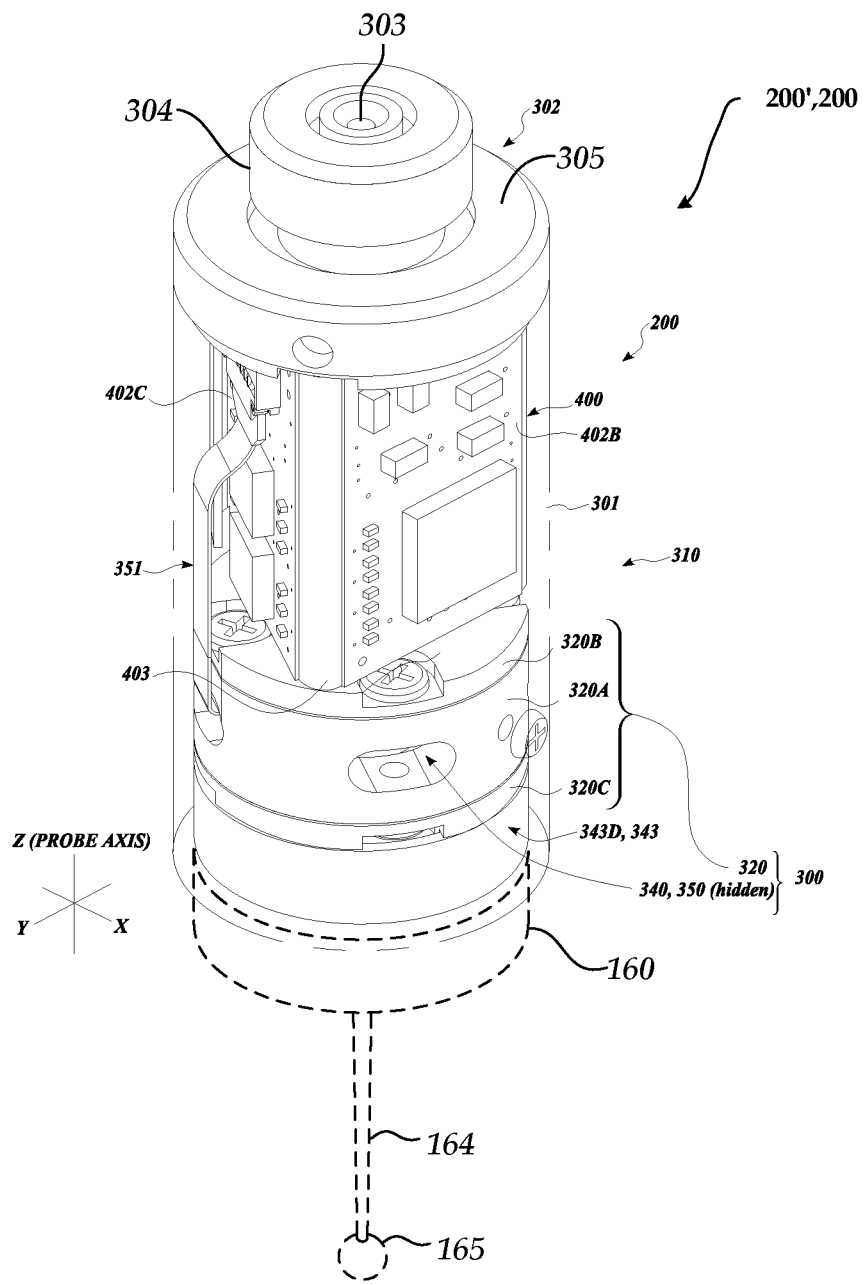
FIG. 2 is a diagram showing a perspective view of an implementation of a touch probe.

FIG. 2 is a diagram showing a perspective view of an implementation of a touch probe 200' including a probe body 200. As shown in FIG. 2, the probe body 200 includes a housing 301 shown in phantom to reveal a circuit board assembly configuration 400 and a moving element assembly 300 disposed in the housing 301. The probe body 200 in this implementation includes the housing 301, a connection assembly 302 configured for connecting the probe body 200 to a measuring system such as a CMM (e.g., the CMM shown in FIG. 1); a rigid probe body structure 310, a circuit board assembly configuration 400, and a moving element assembly 300 comprising a compliant element mounting frame 320, a stylus suspension portion (not shown) and a displacement sensing configuration (not shown).

In the illustrated implementation, the connection assembly 302 includes an interlock collar 304 and a schematically illustrated electrical connector portion 303 for rigidly connecting the probe body 200 and its circuitry to a CMM. The connection assembly 302 connects to the housing 301 at an annular housing cap portion 305. A stylus module 160 attaches a stylus 164 to a stylus suspension portion (not shown) of the probe body 200, which allows the stylus 164 to deflect when its contact portion 165 contacts the surface of a workpiece, to produce a trigger signal.

The compliant element mounting frame 320 is joined to, and forms an additional part of, the rigid probe body structure 310. The compliant element mounting frame 320 includes a central portion 320A, an upper portion 320B and a lower portion 320C, which are clamped together by screws in this implementation. Various compliant and/or moving elements and associated sensing elements 340, 350 are assembled inside the compliant element mounting frame 320, to form the moving element assembly 300.

In one implementation, an axial extension portion 330 (not shown) includes an axial member that has a triangular cross section that is sized to receive the circuit board assembly configuration 400 with the component mounting portions 402A, 402B, 402C generally aligned to overlie a face of the axial extension portion 330. The circuit board assembly configuration 400 is securely disposed and supported within the housing 301, between an upper mounting portion of the connection assembly 302 and the main body of the moving element assembly 300. The illustrated implementation is exemplary only, and not limiting.

In various implementations, the touch probe 200' is relatively compact, and does not include a special processor IC or specialized memory IC, or battery, and does not have additional room for including such components, which restricts the types of circuitry and processing that may be utilized for maintaining and storing various types of data. In some implementations, in order to conserve space and power consumption, a commercially available field programmable gate array (FPGA) is included on the circuit board assembly configuration 400, and configured to provide a minimal number of essential functions such as trigger signal processing, serial communications, and certain memory functions using built-in capabilities of the FPGA. In accordance with principles disclosed herein, electronic components within the circuit board assembly configuration 400 of the touch probe 200' (e.g., which do not require a battery and/or specialized processor IC) are utilized to maintain an accumulated trigger count of the touch probe, as previously outlined, and explained in greater detail below.

Figure 3:
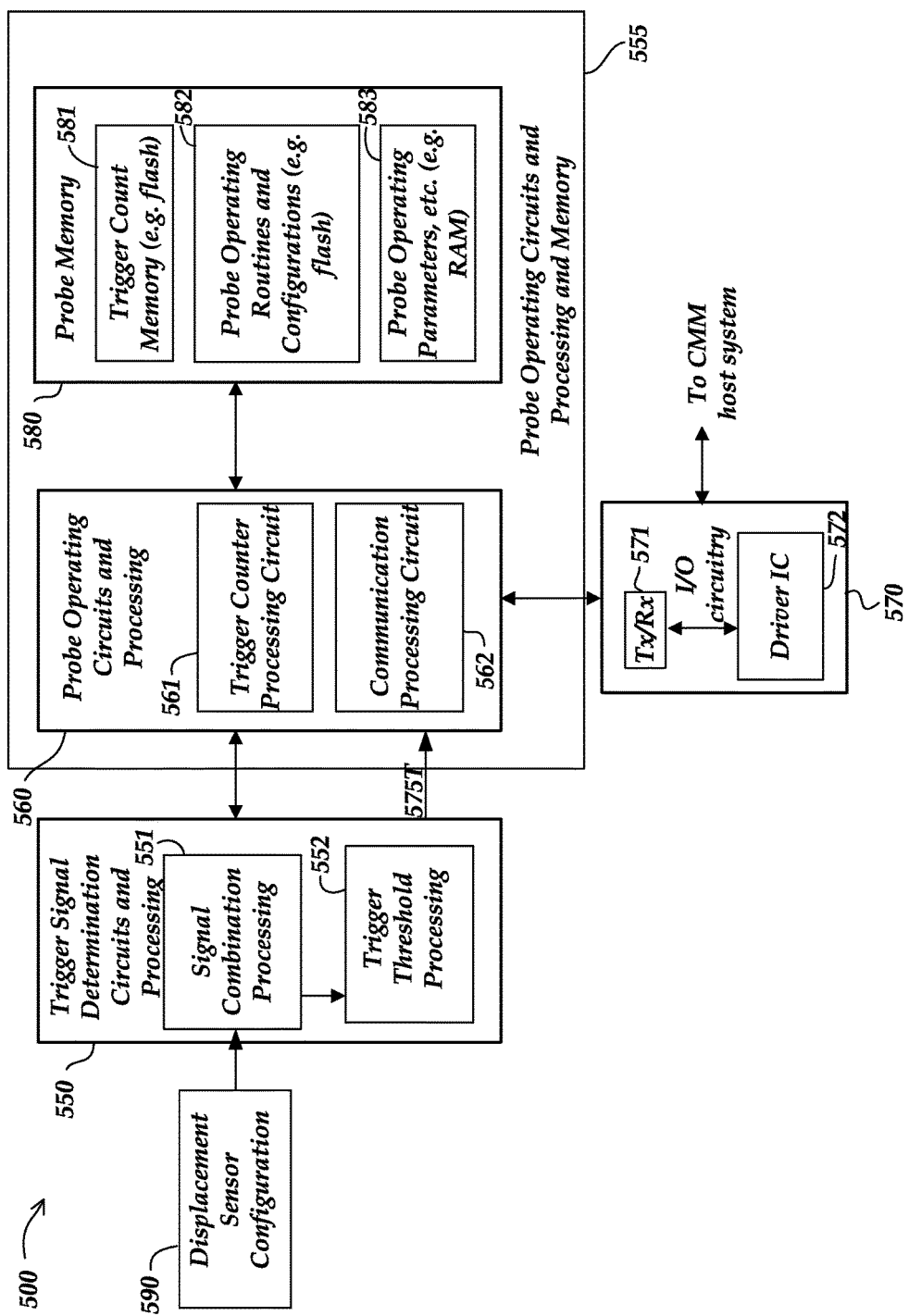
FIG. 3 is a block diagram showing one implementation of electronic circuitry for a touch probe including a trigger counter processing circuit.

FIG. 3 is a block diagram showing various elements of one implementation of electronic circuitry 500 for a touch probe (e.g., as may be included in the circuit board assembly configuration 400 of FIG. 2). In various implementations, a configuration of a compact probe body 200 such as that illustrated in FIG. 2 allows corresponding components to be assembled in the circuit board assembly configuration 400 (e.g., in a compact diameter of 12-15 millimeters) to provide certain signal processing operations in the probe, for example corresponding to the following description, using economical non-custom components. Due to the compact nature of the touch probe 200' and probe body 200, there may correspondingly not be any additional available space for additional components, as a result of which the types of circuitry and processing that may be utilized for maintaining and storing various types of data (e.g., such as an accumulated number of generated touch trigger signals) may be relatively limited. Additional details regarding certain types of electronic circuitry for a touch probe that may perform some similar operations as the electronic circuitry 500 may be found in commonly assigned U.S. Patent Application No. 62/271,082, which is hereby incorporated herein by reference in its entirety.

In the implementation shown in FIG. 3, the electronic circuitry 500 includes a trigger signal determination circuit and processing portion 550, a probe operating circuits and processing and memory portion 555, an input/output circuitry portion 570, and a displacement sensor configuration 590. The trigger signal determination circuit and processing portion 550 includes a signal combination processing portion 551 and a trigger threshold processing portion 552. The probe operating circuits and processing and memory portion 555 includes a probe operating circuits and processing portion 560 and a probe memory portion 580. The probe operating circuits and processing portion 560 includes a trigger counter processing circuit 561 and a communication processing circuit 562. The probe memory portion 580 includes a trigger count memory portion 581, a probe operating routines and configurations memory portion 582, and a probe operating parameters memory portion 583. The input/output circuit portion 570 includes a transmitter/receiver portion 571 and a driver integrated circuit portion 572.

In operation, the displacement sensor configuration 590 is configured to output a sensor signal that is responsive to displacement of a stylus (e.g., the stylus 164) as attached to the touch probe. In various implementations, the displacement sensor configuration 590 may include various components and sensors (e.g., internal flexures, strain gauges, etc.) for sensing relatively small deflections of the touch probe stylus. The trigger signal determination circuits and processing portion 550 may be implemented according to principles known to one skilled in the art of touch probe design. Therefore, it is only described briefly herein with respect to one exemplary implementation. As shown in FIG. 3, it may be desirable to combine a plurality of displacement sensor signals from the displacement sensor configuration 590 in order to provide a combined signal that is compared to a touch trigger signal switching threshold. In various implementations, the trigger signal determination circuits and processing portion 550 may input a specified number of individual offset compensated digital displacement signals (e.g., from various sensors included in the displacement sensor configuration 590, such as a configuration of four strain gauges, etc.).

The signal combination processing portion 551 receives the individual offset compensated digital displacement signals and determines a combined displacement signal which is provided to the trigger threshold processing circuit 552. The trigger threshold processing circuit 552 defines a switching threshold value which is compared to the combined displacement signal. When the combined displacement signal exceeds the switching threshold value, the trigger threshold processing circuit 552 outputs a touch trigger signal 575T indicating that the stylus has contacted a workpiece. In various implementations, the trigger threshold processing circuit 552 may include a known type of hysteresis circuit, which implements hysteresis in relation to the defined switching threshold value, to prevent the touch trigger signal 575T from dithering on and off when the stylus is marginally contacting/not-contacting a workpiece surface. The foregoing outline of exemplary operations of the trigger signal determination circuits and processing portion 550 may be further understood and implemented based on known teachings in the art of touch probe design. For example, one exemplary trigger signal determination circuits and processing portion including methods of signal combination processing as well as switching threshold definition is described in U.S. Pat. No. 7,792,654, which is hereby incorporated herein by reference in its entirety.

The touch trigger signal 575T may be communicated to a CMM host system or the like (e.g., through input/output circuitry portion 570), so that current measurement values in the host system can be recorded to indicate the present coordinates of the stylus and the measurement coordinates of the workpiece surface that it is contacting. In various implementations, certain settings (e.g., default settings) for the trigger threshold processing circuit 552, the trigger counter processing circuit 561 and/or other components or portions of the electronic circuitry 500 may be stored in the probe memory portion 580. For example, various default thresholds to be used by the trigger threshold processing circuit 552 to determine when a touch trigger signal 575T should be generated may be stored in the probe memory portion 580, such as may be accessed when a powered operating period is first started for the touch probe. In addition, certain settings and/or other data for the trigger threshold processing circuit 552 and/or other components or portions of the electronic circuitry 500 may stored in a host system (e.g., the CMM host system). For example, if it determined that the default thresholds for the trigger threshold processing circuit 552 are not producing the desired results in a particular environment and/or application (e.g., too many false trigger signals, etc.), the CMM host system may be configured (e.g., by a user) to provide different thresholds, low pass filter applications, etc., to be used by the trigger threshold processing circuit 552.

In various implementations, such data stored in the CMM host system may be provided each time a new powered operating period is started, and may override any default settings that are stored in the touch probe memory portion 580. It will be appreciated that in certain implementations if the touch probe is moved to a second CMM host system, that any data/settings stored in a first CMM host system with respect to the touch probe may not be available, and that the default data/settings stored in the touch probe may be utilized for initial operations with the second CMM host system. It will be appreciated that, by storing various other configuration data, etc., for the touch probe in the probe memory portion 580 (e.g., as related to the accumulated trigger count, etc.) rather than in the CMM host system, the touch probe is able to continue to operate according to the principles described herein even when the touch probe is moved to a different CMM host system, etc.

The trigger signals 575T that are provided by the trigger threshold processing portion 552 are received by the trigger counter processing circuit 561 which counts the trigger signals 575T when they occur and maintains a corresponding current accumulated trigger count, as will be described in more detail below with respect to FIG. 4. In various implementations, the communication processing circuit 562 may implement a digital communication protocol (e.g., as a serial communication protocol) for communications between various portions of the electronic circuitry 500 and to/from various other systems and/or components (e.g., the CMM host system, etc.). In various implementations, the probe memory portion 580 may include a probe flash memory portion (e.g., as described in more detail below with respect to FIGS. 5A-5C) which may include the memory portions 581 and 582.

In various implementations, the memory portion 581 may include an erasable trigger counter block including N address locations utilized to store a sequence of accumulated trigger counts received from the trigger counter processing circuit 561, and the memory portion 582 may be utilized to store operating routines and/or configuration data for the touch probe. In various implementations, the memory portion 583 may be included in a volatile memory (e.g., RAM) of the touch probe and may be made to store various operating parameters, etc., for the touch probe (e.g., at the start of each new powered operating period, etc.). In various implementations, the input/output circuitry portion 570 may pass control signals, data, and/or parameters between the CMM host system and various elements of the electronic circuitry 500. For example, the input/output circuitry portion 570 may be utilized to provide a current accumulated trigger count from the trigger counter processing circuit 561 to the CMM host controller when requested by the CMM host controller.

Figure 4:
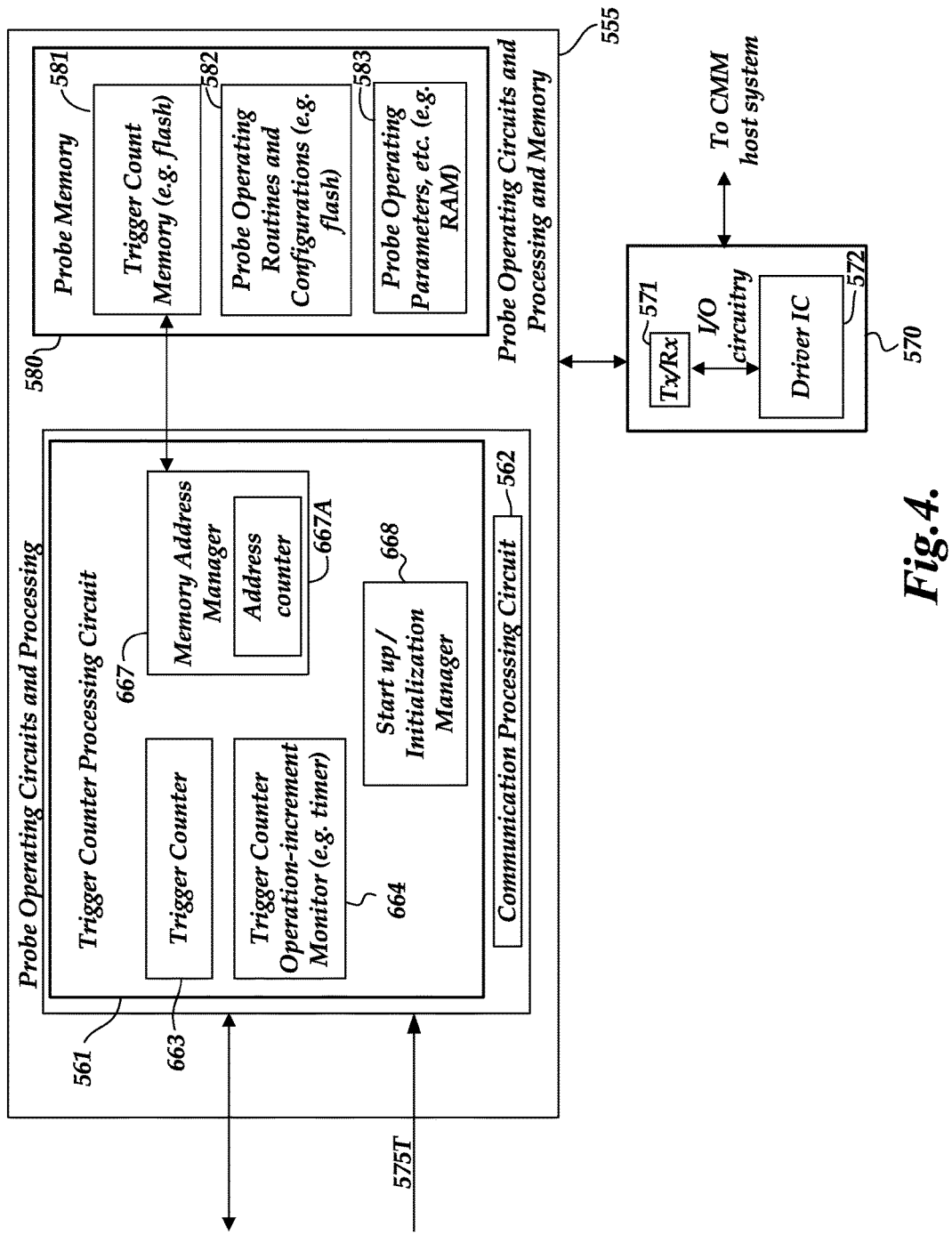
FIG. 4 is a block diagram showing additional details of the trigger counter processing circuit of FIG. 3.

FIG. 4 is a block diagram showing additional details of the trigger counter processing circuit 561 of FIG. 3. As shown in FIG. 4, the trigger counter processing circuit 561 includes a trigger counter portion 663, a trigger counter operation-increment monitor portion 664, a memory address manager portion 667, and a startup/initialization manager portion 668. In various implementations, the trigger counter portion 663 is utilized to count the trigger signals 575T when they occur. The trigger counter operation-increment monitor portion 664 determines when a pre-defined trigger counter operation increment elapses. In one specific example implementation, the pre-defined trigger counter operation-increment may correspond to an amount of time that is at least 1 minute in duration, for which the trigger counter operation-increment monitor portion 664 (e.g., comprising a timer) may determine when the pre-defined trigger counter operation increment has elapsed and the current accumulated trigger count from the trigger counter portion 663 should be stored at a next address location in the memory portion 581. The memory address manager portion 667 includes an address counter 667A and manages and/or performs the identifying of a next target address of the erasable trigger counter block in the memory portion 581 to be used for a next operation storing a current accumulated trigger count (e.g., which in some implementations may be a next higher consecutive address of the erasable trigger counter block, etc.). The startup/initialization manager portion 668 manages and/or performs various initializations (e.g., of the trigger counter portion 663, the trigger counter operation-increment monitor portion 664, and/or the memory address manager portion 667), as will be described in more detail below.

In various implementations, the operating configuration data that is stored in the memory portion 582 comprises trigger counter configuration data for implementing some or all of the portions of the trigger counter processing circuit 561. In various implementations, the touch probe does not include an embedded processor or a battery, and when a new powered operating period is started (e.g., as powered by the CMM host system), the trigger counter configuration data is utilized to implement the trigger counter processing circuit 561 in volatile memory (e.g., in RAM) as a state machine in the touch probe. In such a configuration (e.g., where terminating power may cause RAM or other volatile memory to lose its contents), terminating power to the touch probe may stop operation of the trigger counter processing circuit 561 (e.g., which had been implemented in the RAM or other volatile memory) and correspondingly end the trigger counter processing circuit's maintenance of the current accumulated trigger count.

In various implementations, when a new powered operating period is started, various initializations may be performed (e.g., as managed and/or performed by the startup/initialization manager portion 668). For example, the trigger counter processing circuit 561 (e.g., as implemented in RAM or other volatile memory after the new powered operating period is started) may be initialized with the most recent previously stored value of the accumulated trigger count from the memory portion 581 in the flash memory (e.g., for which stored data is maintained even when power is terminated). In one implementation, the initialization of the trigger counter processing circuit 561 may include setting the trigger counter portion 663 to the most recent previously stored value of the accumulated trigger count, so that the trigger counter portion 663 may continue to maintain the current accumulated trigger count when trigger signals 575T occur. In various implementations, as will be described in more detail below with respect to FIGS. 5A-5C, the address location with the most recent previously stored value of the accumulated trigger count may be determined by searching for the most recent address location (e.g., the highest address location) with a value of zero stored in one or more indicator bits of the address location. Such techniques may be implemented in configurations such as those described above (e.g., which may not include an embedded processor and/or battery) and for which special-purpose hardware (e.g., a state machine) is implemented in the form of the components of the trigger counter processing circuit 561 (e.g., as implemented in an FPGA of the probe memory portion 580) which includes the memory address manager portion 667, etc., for managing the flash memory portion of the probe memory portion 580. In contrast, in more complex configurations, a processor (e.g., running software) may be utilized to implement more complex state machines than what is practical in such a hardware state machine, although as noted above, the spatial and power limitations of the touch probe 200' and probe body 200 may prevent the utilization of such more complex configurations.

As another example of an initialization that may be performed when a new powered operating period is started, the trigger counter operation-increment monitor portion 664 may be initialized. In one implementation, the initialization of the trigger counter operation-increment monitor portion 664 (e.g., comprising a timer) may include resetting the timer or other monitor to a value of zero and/or otherwise restarting the timer or other monitor so as to track when a pre-defined trigger counter operation increment has elapsed. In various implementations, the pre-defined trigger counter operation increment may be defined in terms of an amount of time (e.g., for storing the accumulated trigger count every 15 minutes), or a specified number of operations or events occurring (e.g., for storing the accumulated trigger count after a specified number of trigger counts have occurred, etc.). As another example, a target address location of the erasable trigger counter block in the memory portion 581 may be initialized to be used for a next operation for storing a current accumulated trigger count. In one implementation, the initialization of the target address location may include the memory address manager portion 667 determining or otherwise receiving the address location with the most recent previously stored value of the accumulated trigger count (e.g., as determined according to a highest address location with a value of zero stored in the one or more indicator bits), and then using the address counter 667A to increment to a next address location (e.g., a next higher consecutive or otherwise sequential address location, etc.). The address location counter 667A may also or alternatively be configured to provide an indication when a last address location of the N address locations (e.g., 4,096 address locations) has been reached (e.g., as signifying that all of the N address locations have been used, and that an erase operation sequence should be performed to start a new non-erase cycle, etc.).

In various implementations, a non-erase cycle may span multiple powered operating periods, wherein an end of a powered operating period may include terminating power to the touch probe to end the respective powered operating period. For example, a power termination operation command may be received from a CMM host system (e.g., as sent to ensure that certain procedures are performed before power to the probe is terminated). In various implementations, in response to a power termination operation command (e.g., from a host system), a current accumulated trigger count from the trigger counter processing circuit 561 may be stored using a target address location of the erasable trigger counter block of the memory portion 581, as will be described in more detail below. Thereafter, when a new powered operating period begins during the same non-erase cycle (e.g., before all of the N address locations of the erasable trigger counter block of the memory portion 581 have been used for storing respective accumulated trigger counts), the various initializations described above may again be performed.

As part of normal procedures during a non-erase cycle (e.g., after various initializations have been performed when a new powered operating period is started), various operations may continue to be performed, such as the following. The trigger counter processing circuit 561 may continue to operate to count trigger signals when they occur and maintain the corresponding current accumulated trigger count. After a pre-defined trigger counter operation increment elapses (e.g., as determined by the trigger counter operation-increment monitor portion 664, such as according to an increment of 15 minutes, etc.), at least if the current accumulated trigger count has increased from the most recent previously stored value of the accumulated trigger count, the current accumulated trigger count may be stored in the memory portion 581 using the target address location. In various implementations, the system may be set to only store the current accumulated trigger count if it has increased from the most recent previously stored value of the accumulated trigger count (e.g., to avoid utilizing additional space in memory when no change in value has occurred, etc.). After a current accumulated trigger count has been stored, a next target address location of the erasable trigger counter block in the memory portion 581 may be identified to be used for the next operation storing a current accumulated trigger count, wherein the next target address location is an address location that has not been used in the current non-erase cycle. As noted above, in one implementation the next target address location may be a next higher consecutive address location from the address location utilized to store the most recent accumulated trigger count. In various implementations, the operations for storing an accumulated trigger count after a pre-defined increment (e.g., every 15 minutes) and determining a next target address location may be repeated a plurality of times (e.g., until all of the N address locations of the erasable trigger counter block of the memory portion 581 have been used for storing respective accumulated trigger counts).

In various implementations, after all of the N address locations of the erasable trigger counter block of the memory portion 581 have been used for storing respective accumulated trigger counts, an erase operation sequence may be performed as including operations such as the following. Initially, the erasable trigger counter block of the memory portion 581 may be erased while the trigger counter processing circuit 561 is maintaining the current accumulated trigger count (e.g., as maintained in the trigger counter portion 663). Subsequently (e.g., after the erasing operation has been completed), the maintained current accumulated trigger count (e.g., from the trigger counter portion 663) may be written to an initial target address location (e.g., in the erasable trigger counter block of the memory portion 581) as associated with a new non-erase cycle. In one implementation, the initial target address location may be a first or lowest address location in the erasable trigger counter block of the memory portion 581. Subsequently, the operations for storing an accumulated trigger count after a pre-defined increment (e.g., every 15 minutes) and determining a next target address location may be repeated a plurality of times (e.g., until all of the N address locations of the erasable trigger counter block of the memory portion 581 have again been used for storing respective accumulated trigger counts, after which an erase operation sequence may again be performed, etc.).

Figure 5A:
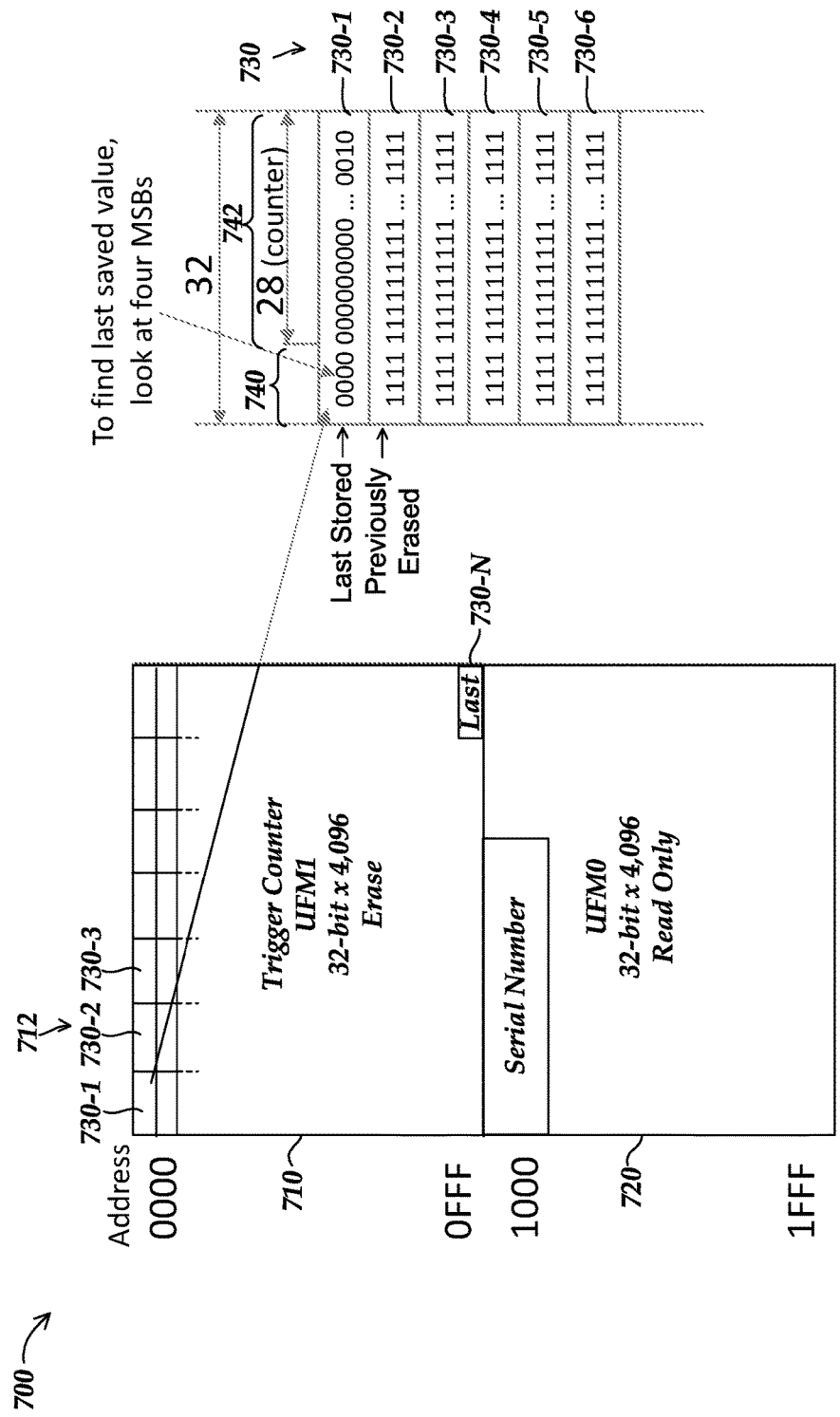
FIGS. 5A-5C are diagrams illustrating operations of a touch probe flash memory for storing accumulated trigger counts.
Figure 5B:
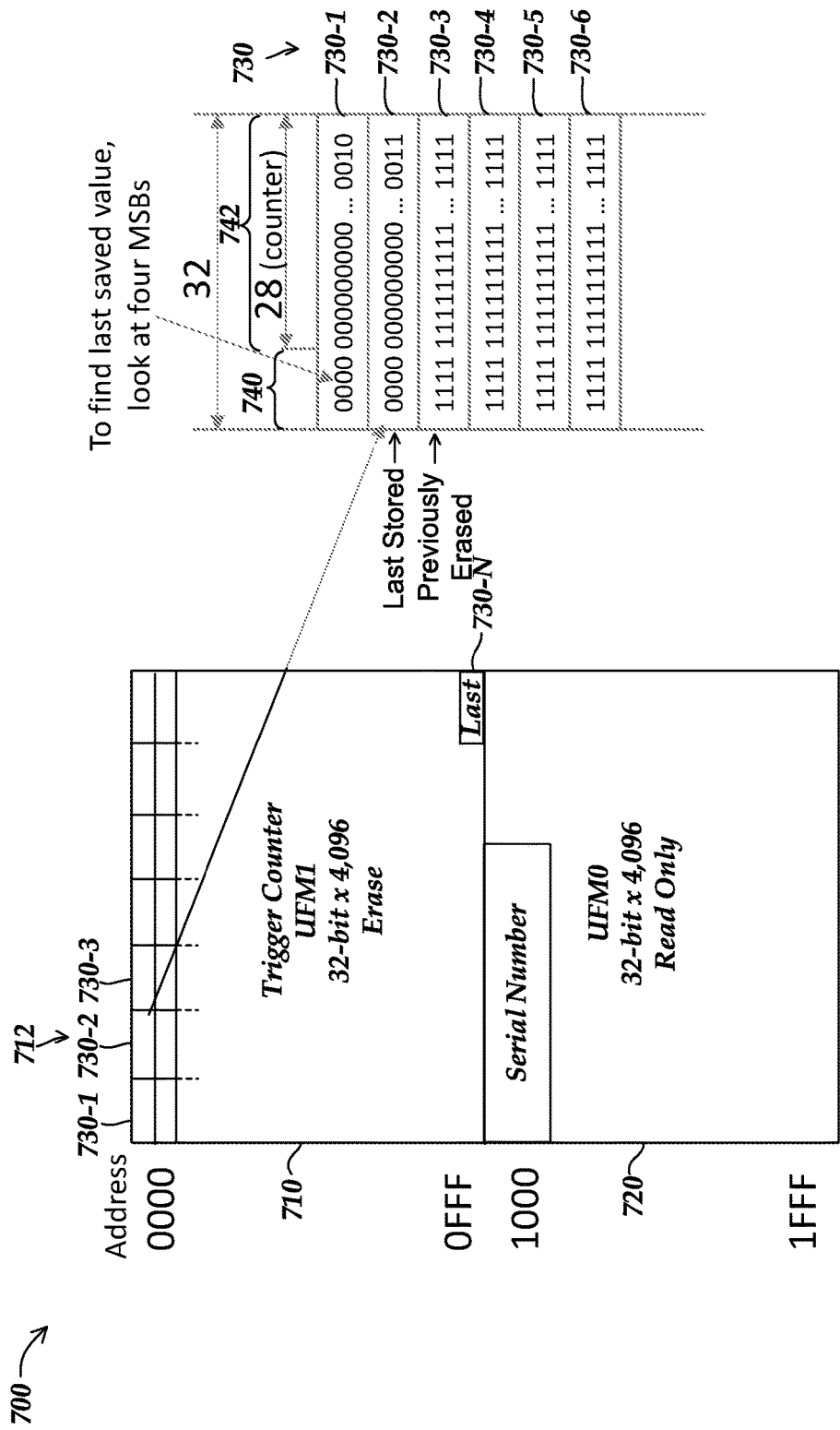
Figure 5C:
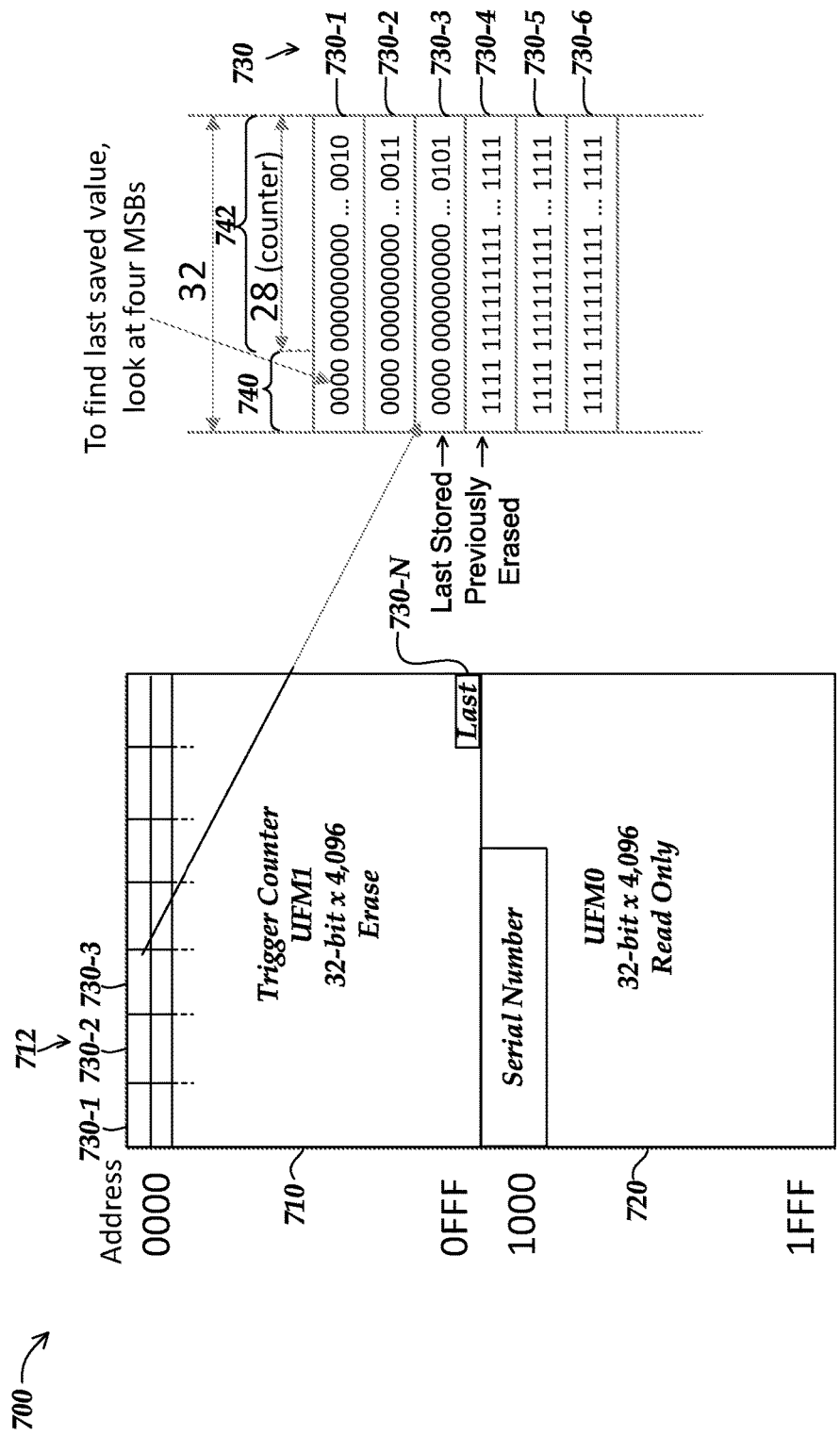

FIGS. 5A-5C are diagrams illustrating operations of a probe flash memory 700 (e.g., as included as part of the probe memory portion 580 of FIGS. 3 and 4) for storing accumulated trigger counts. As shown in FIG. 5A, the probe flash memory 700 includes a first probe memory portion 710 and a second probe memory portion 720 (e.g., corresponding to the memory portions 581 and 582, respectively, of FIGS. 3 and 4). The first probe memory portion 710 includes an erasable trigger counter block 712 including N address locations utilized to store a sequence of accumulated trigger counts received from a trigger counter processing circuit (e.g., the trigger counter processing circuit 561 of FIGS. 3 and 4). The second probe memory portion 720 may be utilized to store operating configuration data and/or routines for a touch probe. With respect to the erasable trigger counter block 712, the address locations 730 may each include a number of indicator bits 740 and may also include a number of additional bits 742. In various implementations, for each address location of the erasable trigger counter block 712 where a value of an accumulated trigger count is stored, at least one indicator bit 740 is utilized to store a value of zero and the additional bits 742 are utilized to store the respective value of the accumulated trigger count. In such a configuration, the value of zero in the at least one indicator bit 740 distinguishes address locations at which values of accumulated trigger counts are currently stored versus address locations where values of accumulated trigger counts are not currently stored, and for which a value of 1 is stored in the at least one indicator bit 740. In various implementations, an address location in which a value of an accumulated trigger count is not currently stored may have a value of 1 stored in all of the bits 740 and 742 (e.g., as may initially be the state for each address location after an erase operation sequence has been performed for the erasable trigger counter block 712).

In various implementations, each of the address locations of an erasable trigger counter block may include at least sixteen bits, and the at least one indicator bit in which a value of zero is stored may be either a most significant bit or a least significant bit. In the specific example implementation of FIG. 5A, each of the address locations 730 includes a total of thirty-two bits, although it will be appreciated that different numbers of bits may be included in different implementations (e.g., eight bits, sixteen bits, sixty-four bits, etc.). As shown in FIG. 5A, the four most significant bits of each address location are designated as indicator bits 740, while the remaining twenty-eight bits are designated as additional bits 742. It will be appreciated that in alternative implementations, different numbers of indicator bits and/or additional bits may be included (such as including only a single indicator bit, or two indicator bits, or eight indicator bits, etc.). In alternative implementations, the indicator bits may also or alternatively be included as least significant bits, or other bits.

In various implementations, the probe flash memory 700 may be included as part of a field-programmable gate array (FPGA). In one such implementation, the trigger counter processing circuit may be implemented in the FPGA. In one specific example implementation, each of the first and second probe memory portions 710 and 720 may include 4,096 address locations with thirty-two bits for each address location, with each of the first and second probe memory portions 710 and 720 also sometimes referred to as user flash memory portions. In various implementations, an existing touch probe configuration may include a flash memory with a portion that is utilized to store configuration and/or other data, and a modification may be made to utilize a different portion of the flash memory to store accumulated trigger counts, etc. (e.g., as part of the memory portion 710, etc.). In various implementations, the flash memory may be of a NOR flash type, or other flash type, wherein all of the cells in a block (e.g., the erasable trigger counter block 712) are erased together as part of an erase operation sequence, etc.

FIGS. 5A-5C illustrate an example sequence in which three accumulated trigger counts are stored over time in the first three consecutive address locations 730-1, 730-2 and 730-3. In general, this sequence illustrates how for powered operating periods of the touch probe during a non-erase cycle during which the erasable trigger counter block 712 is not erased, increasing values of the accumulated trigger count may be stored in the N address locations of the erasable trigger counter block 712. The state of FIG. 5A may represent a period after a pre-defined trigger counter operation increment has elapsed (e.g., according to a timer, such as set for 15 minutes), during a first powered operating period, for which the trigger counter processing circuit has counted two trigger signals that have occurred since a time zero (e.g., at the start of the first usage session of the touch probe, or other designated start time). The current accumulated trigger count with the value of two (e.g., corresponding to "10" in binary) is correspondingly stored at the address location 730-1. In various implementations, after the accumulated trigger count is stored at the address location 730-1, a next target address of the erasable trigger counter block 712 is identified to be used for a next operation for storing an accumulated trigger count, wherein the next target address is an address that has not been used in the current non-erase cycle. In one implementation, the next target address may be the next consecutive address location, which in the present example is the address location 730-2, as will be described in more detail below with respect to FIG. 5B.

As shown in FIG. 5B, after a second pre-defined trigger counter operation increment has elapsed (e.g., after 30 minutes according to a timer increment of every 15 minutes), during a current non-erase cycle, a second value of the current accumulated trigger count is stored at the target address location 730-2. In this instance, the trigger counter processing circuit has counted an additional trigger signal to bring the current total to three trigger signals that have occurred since a time zero. The current accumulated trigger count with the value of three (corresponding to "11" in binary) is stored at the address location 730-2. Following the storing of the accumulated trigger count at the target address location 730-2, a next target address location is identified to be used for the next operation storing a current accumulated trigger count, such as the address location 730-3, as will be described in more detail below with respect to FIG. 5C.

As shown in FIG. 5C, after a third pre-defined trigger counter operation increment has elapsed (e.g., after 45 minutes according to a timer increment of every 15 minutes), a third current accumulated trigger count is stored at the target address location 730-3. In this instance, the trigger counter processing circuit has counted two additional trigger signals, to bring the current total to five trigger signals that have occurred since the time zero. The current accumulated trigger count with the value of five (corresponding to "101" in binary) is stored at the address location 730-3. After the current accumulated trigger count is stored at the address location 730-3, a next target address location is identified to be used for the next operation for storing a current accumulated trigger count, which in this example may be the address location 730-4.

In various implementations, the sequence of operations illustrated by the examples of FIGS. 5A-5C may be repeated a plurality of times until all of the N address locations (e.g., 4,096 address locations) of the erasable trigger counter block 712 have been used for storing respective accumulated trigger counts. As described above, after the N address locations of the erasable trigger counter block 712 have been filled (e.g., after an accumulated trigger counter count has been stored in a last available address location 730-N, which may signify an end of a current non-erase cycle), an erase operation sequence may be performed, which may include the following operations. As an initial first operation, the erasable trigger counter block 712 may be erased while the trigger counter processing circuit (e.g., trigger counter processing circuit 561 of FIGS. 3 and 4) is maintaining the current accumulated trigger count. In various implementations, the flash memory may be of a flash type (e.g., NOR flash type, etc.) wherein all of the cells in a block (e.g., the erasable trigger counter block 712) are erased together. As a second operation, the maintained current accumulated trigger count may be stored in an initial target address location (e.g., a first address location, such as address location 730-1) associated with a new non-erase cycle that may begin after the erasable trigger counter block 712 is erased. In various implementations, the maintained current accumulated trigger count may be stored in the initial target address location automatically at the start of a new non-erase cycle, or may be stored after a pre-defined trigger counter operation increment has elapsed. Additional operations may then continue to be performed as part of the new non-erase cycle, including repeating the operations for storing the current accumulated trigger counts and identifying the next target address locations, such as are illustrated by the sequence of operations of FIGS. 5A-5C, until the erasable trigger counter block 712 is again filled, after which the erase operation sequence may again be performed so as to start a new non-erase cycle, and for which the cycle may continue to repeat in this manner (e.g., for as long as the touch probe is considered operational).

In various implementations, a non-erase cycle may span multiple powered operating periods, wherein an end of a powered operating period may include terminating power to the touch probe to end the respective powered operating period. In various implementations, in response to a power termination operation command (e.g., as received from a CMM host system), a current accumulated trigger count may be stored using a target address location of the erasable trigger counter block 712. For example, with respect to the state of FIG. 2, in one example scenario the current accumulated trigger count (e.g., with the value of three) may have been stored at the address location 730-2 in response to a power termination operation command (e.g., as opposed to being stored in response to a pre-defined trigger counter operation increment having elapsed). Thereafter, when a new powered operating period begins during the same non-erase cycle, the trigger counter processing circuit may be initialized with the most recent previously stored value of the accumulated trigger count (e.g., as stored at the address location 730-2 in this example scenario).

As noted above, in various implementations, the address location with the most recent previously stored value of the accumulated trigger count may be determined by searching for the most recent address location (e.g., the highest address location) with a value of zero stored in the indicator bit(s) 740 of the address location, which in this example scenario corresponds to the address location 730-2. In addition, a target address location of the erasable trigger counter block 712 may be initialized to be used for a next operation for storing a current accumulated trigger count. In one implementation, the initialization of the target address location may include determining the address location with the most recent previously stored value of the accumulated trigger count (e.g., the address location 730-2 in this example scenario) and then incrementing or otherwise determining a next address location (e.g., a next higher consecutive or otherwise sequential address location, such as the address location 730-3 in this example scenario) to be initialized as the target address to be used for the next operation for storing a current accumulated trigger count (e.g., as illustrated with respect to FIG. 5C).

As noted above, in various implementations, a next operation for storing a current accumulated trigger count may occur due to a pre-defined trigger counter operation increment having elapsed, or a power termination operation command having been received, etc. In one alternative implementation, a current accumulated trigger count may not be stored when a power termination operation command is received or otherwise when power is terminated, in which case any additionally counted trigger signals in the trigger counter processing circuit since the last stored accumulated trigger count may not be included in the accumulated trigger count (e.g., when the next powered operating period begins, etc.). In such an implementation, or other implementations where some trigger counts may occasionally not be stored, the accumulated trigger count may represent a close and meaningful approximation of the number of trigger signals generated in the touch probe over its operating history, as opposed to a perfectly precise total number of trigger signals.

In various implementations, the probe flash memory 700 may have a memory lifetime expectancy defined by a finite number of store-erase cycles (i.e., also known as program-erase cycles, which may correspond to non-erase cycles). For example, for certain types of probe flash memory, the finite number of store-erase cycles may fall between 5,000 and 200,000 store-erase cycles. In one specific example implementation for one type of flash memory, the memory lifetime expectancy may correspond to approximately 10,000 store-erase cycles. In such an implementation, it will be appreciated that, if the accumulated trigger count were stored in the same address location each time (e.g., the address location 730-1), which would thus require a store-erase cycle for each storing operation, and if the timer was set to have the accumulated trigger count stored every 15 minutes over a continuous time period, the flash memory would reach its memory lifetime expectancy in approximately 104 days, which may be considered to be too short of a time period for such applications.

In accordance with the principles disclosed herein, by instead storing the accumulated trigger counts in different address locations (e.g., consecutive address locations), and only performing a store-erase cycle once the N-address locations have been filled, in a similar configuration with 4,096 address locations and storing every 15 minutes over a continuous time period, the memory lifetime expectancy of 10,000 store-erase cycles would not be reached for years (e.g., approximately 1,168 years in this specific example). It will be appreciated that in other implementations, a different sized erasable trigger counter block 712 (e.g., with fewer than 4,096 address locations) may be utilized while still effectively providing an acceptable period of time for the memory lifetime expectancy, depending on the frequency of the storing the accumulated trigger counts. As noted above, these techniques may be implemented in a touch probe that is configured according to the principles disclosed herein (e.g., which may not include an embedded specialized processor IC or battery) and for which special-purpose hardware (e.g., a state machine) may be implemented in the form of the components of the trigger counter processing circuit (e.g., as implemented in an FPGA and/or otherwise in RAM of the probe memory, etc.).

Figure 6:
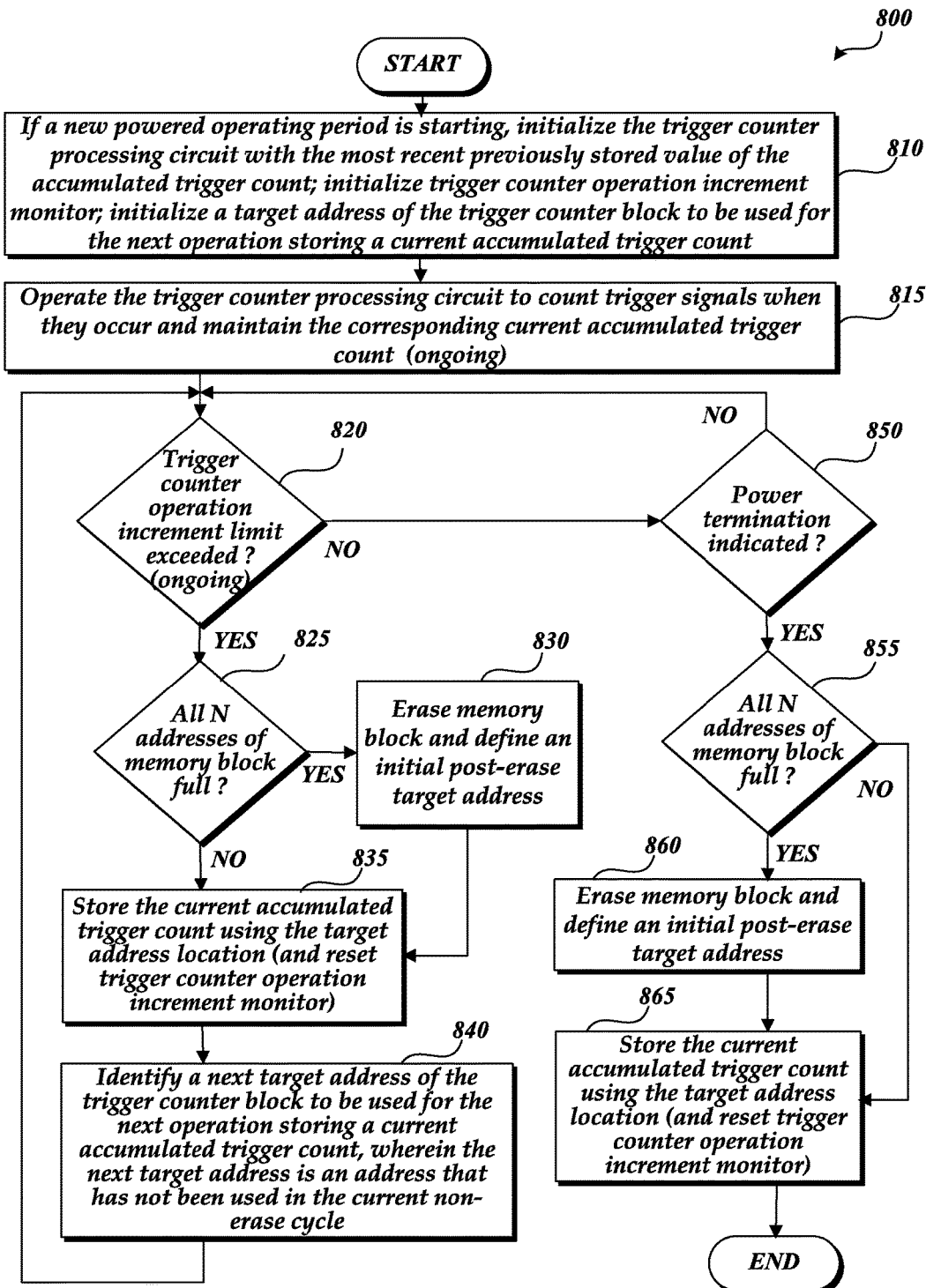
FIG. 6 is a flow diagram illustrating one exemplary implementation of a routine for storing all accumulated trigger counts over the operating history of a touch probe.

FIG. 6 is a flow diagram illustrating one exemplary implementation of a routine 800 to be used in a method for storing an effectively unlimited number of accumulated trigger counts (e.g., hundreds of millions of accumulated trigger counts) over an "unlimited" period of use or operation of a touch probe. As noted above, in various implementations the use of a touch probe and/or various components thereof may be tracked by implementing a trigger counter processing circuit in the probe memory (e.g., in an FPGA of the touch probe, etc.). At a block 810, if a new powered operating period is starting, a trigger counter processing circuit is initialized with the most recent previously stored value of the accumulated trigger count, a trigger counter operation increment monitor is initialized, and a target address of the trigger counter block is initialized to be used for the next operation storing a current accumulated trigger count. As described above, in various implementations this process may include the touch probe searching the flash memory portion (e.g., starting at the lowest address location) and looking for an address location according to a specified criteria (e.g., looking for the highest address location) that has a value of zero stored in the indicator bit(s), and which is thus the address location with the most recent previously stored value of the accumulated trigger count.

The trigger counter processing circuit is initialized using (e.g., loaded or otherwise provided with, etc.) this most recent previously stored value of the accumulated trigger count so that the trigger counter processing circuit can resume the count where it was at the time when the previous powered operating period ended. The address location with the most recent previously stored value of the accumulated trigger count may also be utilized to initialize (e.g., to provide, select or otherwise determine) the next target address (e.g., by incrementing to a next address location, etc.) to be used for the next operation storing a current accumulated trigger count. In various implementations, such operations may be the primary or only instances where the flash memory is searched (e.g., by the touch probe) for the most recent previously stored value of the accumulated trigger count.

At a block 815, the trigger counter processing circuit is operated to count trigger signals when they occur and to maintain the corresponding current accumulated trigger count. At a decision block 820, a determination is made as to whether a trigger counter operation increment limit has been exceeded. As described above, the operations of the trigger counter processing circuit for counting trigger signals and the determination as to whether a trigger counter operation increment limit has been exceeded may be ongoing processes that continue to be performed throughout the powered operating period. In various implementations, the determination as to whether the trigger counter operation increment limit (e.g., as defined by a time increment, or a specified number of operations or events occurring, such as a specified number of trigger signals, etc.) has been exceeded may in some instances comprise determining if a pre-defined trigger counter operation increment has elapsed. In various implementations, a determination may also be made as to whether the current accumulated trigger count has increased from the most recent previously stored value of the accumulated trigger count (e.g., wherein the current accumulated trigger count may only be stored if the count has increased, so as to avoid unnecessarily utilizing address locations to store duplicate values, etc.).

If the trigger counter operation increment limit has not been exceeded, the routine proceeds to a block 850, as will be described in more detail below. If the trigger counter operation increment limit has been exceeded, the routine proceeds to a decision block 825, where a determination is made as to whether all of the available N address locations of the erasable trigger counter block in the first probe memory portion are full. If all of the available address locations are full, the routine proceeds to a block 830, where the erasable trigger counter block in the first probe memory portion is erased and an initial post-erase target address location is defined. After the block 830, or after the block 825 if all of the available address locations are not full, the routine proceeds to a block 835, where the current accumulated trigger count is stored using the target address location. In addition, the trigger counter operation increment monitor may be reset at this point.

At a block 840, a next target address location of the erasable trigger counter block is identified to be used for a next operation for storing a current accumulated trigger count. In various implementations, the next target address location may be an address location that has not been used in the current non-erase cycle. As illustrated above with respect to FIGS. 5A-5C, in one implementation the next target address location may be the next higher sequential address location. After the next target address location is identified, the routine returns to decision block 820.

If at decision block 820 the trigger counter operation increment limit has not been exceeded, the routine proceeds to the decision block 850, where a determination is made as to whether a power termination is indicated. In various implementations, a power termination may be indicated by a power termination signal that is received from a CMM host controller. If a power termination is not indicated, the routine returns to the decision block 820. If a power termination is indicated, the routine proceeds to a decision block 855, where a determination is made as to whether all of the N address locations of the erasable trigger counter block of the first probe memory portion are full. If all of the address locations are not full, the routine proceeds to a block 865, as will be described in more detail below. If all of the address locations are full, at a block 860 the erasable trigger counter block is erased and an initial post-erase target address location is determined. At the block 865, the current accumulated trigger count is stored using the target address location. In addition, the trigger counter operation increment monitor may be reset. It will be appreciated that following the power termination for a touch probe, the routine 800 may be repeated when a new powered operating period for the touch probe is again started. In this manner, the method may continue to store a value in the touch probe corresponding to an effectively unlimited number of accumulated trigger counts over an "unlimited" period of use or operation of a touch probe.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

What is claimed is:

1. A method for operating a touch probe for a coordinate measuring machine (CMM), the method usable to permanently store a value in the touch probe corresponding to an accumulated number of trigger signals generated in the touch probe over its operating history:
    the touch probe comprising:
        a displacement sensor configured to output at least one sensor signal that is responsive to displacement of a stylus attached to the touch probe;
        a trigger signal generating circuit which inputs the at least one sensor signal and produces a trigger signal corresponding to a displacement of the stylus;
        a trigger counter processing circuit which counts trigger signals when they occur and maintains a corresponding current accumulated trigger count, wherein terminating power to the touch probe stops operation of the trigger counter processing circuit and ends the maintenance by the trigger counter processing circuity of the current accumulated trigger count; and
        a probe flash memory comprising a first probe memory portion and a second probe memory portion, wherein the first probe memory portion comprises an erasable trigger counter block including N address locations utilized to store a sequence of accumulated trigger counts received from the trigger counter processing circuit, and the second probe memory portion is utilized to store operating configuration data for the touch probe;
    the method comprising:
        for powered operating periods of the touch probe during a non-erase cycle during which the erasable trigger counter block is not erased, storing increasing values of the accumulated trigger count in the N address locations of the erasable trigger counter block, including operations comprising:
            a) when a new powered operating period is started, initializing the trigger counter processing circuit with the most recent previously stored value of the accumulated trigger count, initializing a trigger counter operation increment monitor, and initializing a target address location of the erasable trigger counter block to be used for the next operation storing a current accumulated trigger count;
            b) operating the trigger counter processing circuit to count trigger signals when they occur and maintain the corresponding current accumulated trigger count;
            c) after a pre-defined trigger counter operation increment elapses, at least if the current accumulated trigger count has increased from the most recent previously stored value of the accumulated trigger count, storing the current accumulated trigger count using the target address location;
            d) after performing the operation c), identifying a next target address location of the erasable trigger counter block to be used for the next operation storing a current accumulated trigger count, wherein the next target address location is an address location that has not been used in the current non-erase cycle; and
            e) repeating operations c) and d) a plurality of times until all of the N address locations of the erasable trigger counter block have been used for storing respective accumulated trigger counts.

2. The method of claim 1, wherein the non-erase cycle spans at least first and second powered operating periods and at least the first powered operating period includes terminating power to the touch probe to end the first powered operating period.

3. The method of claim 1, further comprising a power termination operation sequence comprising:
    receiving a power termination operation command from a host system; and
    in response to the power termination operation command from the host system, storing the current accumulated trigger count using the target address location.

4. The method of claim 1, further comprising performing an erase operation sequence when all of the N address locations of the erasable trigger counter block have been used during the non-erase cycle to store accumulated trigger counts, the erase operation sequence comprising:
    f1) erasing the erasable trigger counter block while the trigger counter processing circuit is maintaining the current accumulated trigger count;
    f2) storing the maintained current accumulated trigger count in an initial target address location associated with a new non-erase cycle; and
    f3) initiating a new non-erase cycle including operations comprising a)-e).

5. The method of claim 1, wherein the probe flash memory has a memory lifetime expectancy defined by a finite number of store-erase cycles, and for which the finite number of store-erase cycles falls between 5000 and 200000 store-erase cycles.

6. The method of claim 1, wherein the probe flash memory is included as part of a field-programmable gate array (FPGA) of the touch probe, and the trigger counter processing circuit is implemented in the FPGA.

7. The method of claim 1, wherein the operating configuration data that is stored in the second probe memory portion comprises trigger counter configuration data for implementing the trigger counter processing circuit.

8. The method of claim 7, wherein the touch probe does not include an embedded processor or a battery, and when a new powered operating period is started, as part of operation a) before the trigger counter processing circuit is initiated, the trigger counter configuration data is utilized to implement the trigger counter processing circuit in volatile memory as a state machine in the touch probe.

9. The method of claim 1, wherein the trigger counter processing circuit comprises a memory address manager that performs at least the identifying of a next target address location in the operation d).

10. The method of claim 1, wherein each next target address location in operation d) is a next higher consecutive address location of the erasable trigger counter block.

11. The method of claim 1, wherein the trigger counter processing circuit comprises a trigger counter operation-increment monitor that determines when the pre-defined trigger counter operation increment elapses as part of operation c).

12. The method of claim 11, wherein the trigger counter operation-increment monitor is a timer and the pre-defined trigger counter operation increment corresponds to an amount of time that is at least 1 minute in duration.

13. The method of claim 1, further comprising providing a current accumulated trigger count from the trigger counter processing circuit to a CMM host controller when requested by the CMM host controller.

14. The method of claim 1, wherein for each address location of the erasable trigger counter block where a value of an accumulated trigger count is stored, at least one indicator bit is utilized to store a value of zero and a plurality of additional bits are utilized to store the respective value of the accumulated trigger count, wherein the value of zero in the at least one indicator bit distinguishes address locations at which values of accumulated trigger counts are currently stored versus address locations where values of accumulated trigger counts are not currently stored and for which a value of 1 is stored in the at least one indicator bit.

15. The method of claim 14, wherein each address location where a value of an accumulated trigger count is stored comprises at least sixteen bits, and the at least one indicator bit in which a value of zero is stored is either a most significant bit or a least significant bit.

16. The method of claim 14, wherein as part of operation a) when a new powered operating period is started, the most recent previously stored value of the accumulated trigger count is determined according to the stored value at the highest address location in the erasable trigger counter block that has a value of zero stored in the at least one indicator bit.

17. The method of claim 16, wherein as part of the operation a), the target address location that is initialized is determined as the address location in the erasable trigger counter block that is the next higher consecutive address location relative to the highest address location that has a value of zero stored in the at least one indicator bit.

18. A touch probe for a coordinate measuring machine, the touch probe comprising:
a trigger signal generating circuit which produces a trigger signal corresponding to a displacement of a stylus attached to the touch probe;
a probe flash memory comprising:
a first probe memory portion comprising an erasable trigger counter block including N address locations utilized to store a sequence of accumulated trigger counts, and
a second probe memory portion storing operating configuration data for the touch probe including trigger counter configuration data for implementing a trigger counter processing circuit which counts trigger signals when they occur and maintains a corresponding current accumulated trigger count, wherein terminating power to the touch probe stops operation of the trigger counter processing circuit and ends its maintenance of the current accumulated trigger count;
wherein:
for powered operating periods of the touch probe during a non-erase cycle during which the erasable trigger counter block is not erased, operations are automatically performed comprising:
a) when a new powered operating period of the touch probe is started, the trigger counter configuration data is utilized to implement the trigger counter processing circuit in volatile hardware as a state machine in the touch probe, the trigger counter processing circuit is initialized with a most recent previously stored value of the accumulated trigger count, and a target address location of the erasable trigger counter block is determined to be used for a next operation storing a current accumulated trigger count;
b) the trigger counter processing circuit is operated to count trigger signals when they occur and maintain the corresponding current accumulated trigger count;
c) after a pre-defined trigger counter operation increment elapses, at least if the current accumulated trigger count has increased from the most recent previously stored value of the accumulated trigger count, the current accumulated trigger count is stored using the target address location;
d) after the operation c) is performed, a next target address location of the erasable trigger counter block is identified to be used for the next operation storing a current accumulated trigger count, wherein the next target address location is an address location that has not been used in the current non-erase cycle; and
e) operations c) and d) are repeated a plurality of times until all of the N address locations of the erasable trigger counter block have been used for storing respective accumulated trigger counts.

19. The touch probe of claim 18, wherein an erase operation sequence is automatically performed when all of the N address locations of the erasable trigger counter block have been used during the non-erase cycle to store accumulated trigger counts, the erase operation sequence comprising:
f1) erasing the erasable trigger counter block while the trigger counter processing circuit is maintaining the current accumulated trigger count;
f2) storing the maintained current accumulated trigger count in an initial target address location associated with a new non-erase cycle; and
f3) initiating a new non-erase cycle including operations comprising a)-e).

20. The touch probe of claim 18, wherein the probe flash memory is included as part of a field-programmable gate array (FPGA) of the touch probe, and the trigger counter processing circuit is implemented in the FPGA.

21. The touch probe of claim 20, wherein the touch probe does not include an embedded processor or a battery.

22. The touch probe of claim 18, wherein for each address location of the erasable trigger counter block where a value of an accumulated trigger count is stored, at least one indicator bit is utilized to store a value of zero and a plurality of additional bits are utilized to store the respective value of the accumulated trigger count, wherein the value of zero in the at least one indicator bit distinguishes address locations at which values of accumulated trigger counts are currently stored versus address locations where values of accumulated trigger counts are not currently stored and for which a value of 1 is stored in the at least one indicator bit.

23. A method for operating a touch probe for a coordinate measuring machine, the touch probe comprising a trigger signal generating circuit which produces a trigger signal corresponding to a displacement of a stylus attached to the touch probe, the method usable to store a value in the touch probe corresponding to an accumulated number of trigger signals generated in the touch probe, the method comprising:

for powered operating periods of the touch probe during a non-erase cycle during which an erasable trigger counter block in a probe flash memory of the touch probe is not erased, storing increasing values of an accumulated trigger count in N address locations of the erasable trigger counter block, including operations comprising:
  a) when a new powered operating period is started, utilizing stored trigger counter configuration data to implement a trigger counter processing circuit as a state machine in the touch probe, initializing the trigger counter processing circuit with a most recent previously stored value of the accumulated trigger count, and determining a target address location of the erasable trigger counter block to be used for a next operation storing an accumulated trigger count;
  b) operating the trigger counter processing circuit to count trigger signals when they occur and maintain the corresponding current accumulated trigger count;
  c) after a pre-defined trigger counter operation increment elapses, at least if the current accumulated trigger count has increased from the most recent previously stored value of the accumulated trigger count, storing the current accumulated trigger count using the target address location;
  d) after performing the operation c), identifying a next target address location of the erasable trigger counter block to be used for the next operation storing a current accumulated trigger count, wherein the next target address location is an address location that has not been used in the current non-erase cycle; and
  e) repeating operations c) and d) a plurality of times.

24. The touch probe of claim 23, wherein an erase operation sequence is automatically performed when all of the available N address locations of the erasable trigger counter block have been used during the non-erase cycle to store accumulated trigger counts, the erase operation sequence comprising:
  f1) erasing the erasable trigger counter block while the trigger counter processing circuit is maintaining the current accumulated trigger count;
  f2) storing the maintained current accumulated trigger count in an initial target address location associated with a new non-erase cycle; and
  f3) initiating a new non-erase cycle including operations comprising a)-e).

25. The touch probe of claim 23, wherein for each address location of the erasable trigger counter block where a value of an accumulated trigger count is stored, at least one indicator bit is utilized to store a value of zero and a plurality of additional bits are utilized to store the respective value of the accumulated trigger count, wherein the value of zero in the at least one indicator bit distinguishes address locations at which values of accumulated trigger counts are currently stored versus address locations where values of accumulated trigger counts are not currently stored and for which a value of 1 is stored in the at least one indicator bit.

* * * * *